United States Patent
Lew et al.

(10) Patent No.: US 11,327,690 B2
(45) Date of Patent: May 10, 2022

(54) ENHANCED INPUT OF MACHINE-LEARNING ACCELERATOR ACTIVATIONS

(71) Applicant: Google LLC, Mountain View, CA (US)

(72) Inventors: Lukasz Lew, Sunnyvale, CA (US); Wren Romano, Mountain View, CA (US)

(73) Assignee: Google LLC, Mountain View, CA (US)

(*) Notice: Subject to any disclaimer, the term of this patent is extended or adjusted under 35 U.S.C. 154(b) by 52 days.

(21) Appl. No.: 16/718,055

(22) Filed: Dec. 17, 2019

(65) Prior Publication Data

US 2021/0141571 A1    May 13, 2021

Related U.S. Application Data

(60) Provisional application No. 62/935,038, filed on Nov. 13, 2019.

(51) Int. Cl.
   *G06F 3/06* (2006.01)
   *G06N 20/00* (2019.01)
   *G06F 9/50* (2006.01)

(52) U.S. Cl.
   CPC .......... *G06F 3/0679* (2013.01); *G06F 3/0604* (2013.01); *G06F 3/0655* (2013.01); *G06F 9/50* (2013.01); *G06N 20/00* (2019.01)

(58) Field of Classification Search
   CPC .... G06F 3/0679; G06N 20/00; G06N 3/0604; G06N 3/0655; G06N 9/50; G06N 12/0888; G06N 12/0813; G06N 12/0862; G06N 2212/6026; G06N 2212/507; G06N 2212/454; G06N 2212/1024; G06N 12/0207; G06N 9/3001; G06N 9/30036; G06N 3/063; G06N 3/0454
   See application file for complete search history.

(56) References Cited

U.S. PATENT DOCUMENTS

| | | | |
|---|---|---|---|
| 9,805,303 B2* | 10/2017 | Ross | G06N 3/063 |
| 2018/0267898 A1* | 9/2018 | Henry | G06N 3/0454 |
| 2019/0079761 A1 | 3/2019 | Diamon et al. | |
| 2019/0121668 A1 | 4/2019 | Knowles | |

FOREIGN PATENT DOCUMENTS

| | | |
|---|---|---|
| CN | 108009106 | 5/2018 |
| CN | 109871275 | 6/2019 |

(Continued)

OTHER PUBLICATIONS

Georganas et al., "Anatomy of High-Performance Deep Learning Convolutions on SIMD Architectures" arXiv, Aug. 2018, 12 pages.

(Continued)

*Primary Examiner* — Elias Mamo
(74) *Attorney, Agent, or Firm* — Fish & Richardson P.C.

(57) ABSTRACT

Methods, systems, and apparatus, including computer programs encoded on computer storage media, for scheduling operations on a machine-learning accelerator having multiple tiles. The apparatus includes a processor having a plurality of tiles and scheduling circuitry that is configured to select a respective input activation for each tile of the plurality of tiles from either an activation line for the tile or a delay register for the activation line.

18 Claims, 9 Drawing Sheets

(56) References Cited

FOREIGN PATENT DOCUMENTS

TW           201915731      4/2019
WO    WO 2016/186826      11/2016

OTHER PUBLICATIONS

Lee et al., "Efficient SIMD implementation for accelerating convolutional neural network" Proceedings of the 4th International Confernece on Communication and Information, Nov. 2018, 6 pages.
Misra et al., "HOG and Spatial Convolution on SIMD Architecture" Robotics Institute, 2015, 7 pages.
Vermorel, "Fast 1D convolution with AVX" Joannes Vermorel's blog, Jan. 2018, 2 pages.
Extended European Search Report in European Application No. 20193932.9, dated Mar. 10, 2021, 11 pages.
Delmas Lascorz et al., "Bit-Tactical: Exploiting Ineffectual Computations in Convolutional Neural Networks: Which, Why, and How" arXiv, Mar. 2018, 14 pages.
PCT International Search Report and Written Opinion in International Application No. PCT/US2020/047784, dated Dec. 16, 2020, 15 pages.
TW Office Action in Taiwan Application No. 109129735, dated Jun. 8, 2021, 12 pages (with English translation).

* cited by examiner

Global Tick 1, local tick 1

| | c0 | c1 | c2 | c3 | c4 | c5 |
|---|---|---|---|---|---|---|
| r0 | | A+ | B+ | C- | | |
| r1 | | D+ | E+ | F- | | |
| r2 | | G+ | H+ | I- | | |

Delay Register Data *210* {c1, c2, c3 (left portion)}
Activation Line Data *220* {c3 (right), c4, c5}

Tiles 0-2 (r0)
Tiles 3-5 (r1)
Tiles 6-8 (r2)

$V01 = R0C1*A + R0C2*B + R0C3*C + R1C1*D + R1C2*E + R1C3*F + R2C1*G + R2C2*H + R2C3*I$

Output values produced: V01

FIG. 2

Computation of Global Tick 0, local tick 0

|  | Delay Register Data 210 | | | Activation Line Data 220 | | |
|---|---|---|---|---|---|---|
|  | c0 | c1 | c2 | c3 | c4 | c5 |
| r0 |  |  |  |  |  |  |
| r1 | A+ | B+ | C+ |  |  |  |
| r2 | D+ | E+ | F+ |  |  |  |
| r4 | G+ | H+ | I+ |  |  |  |

Tiles 3-5
Tiles 6-8
Tiles 0-2

V10 = R1C0*A + R1C2*B + R1C3*C + R2C0*D + R2C1*E + R2C2*F + R3C0*G + R3C1*H + R3C2*I

Output values produced

| V10 |  |  |  |
|---|---|---|---|
|  |  |  |  |
|  |  |  |  |
|  |  |  |  |
|  |  |  |  |

FIG. 3B

Computation of Global Tick 0, local tick 1

|  | c0 | c1 | c2 | c3 | c4 | c5 |
|---|---|---|---|---|---|---|
| r0 |  |  |  |  |  |  |
| r1 |  | A+ | B+ | C- |  |  |
| r2 |  | D+ | E+ | F- |  |  |
| r4 |  | G+ | H+ | I- |  |  |

Delay Register Data 210 (c1–c2), Activation Line Data 220 (c3–c5)

Tiles 3-5, Tiles 6-8, Tiles 0-2

$V11 = R1C1*A + R1C2*B + R1C3*C + R2C1*D + R2C2*E + R2C3*F + R3C1*G + R3C2*H + R3C3*I$

Output values produced:

| V10 | V11 |  |  |  |
|---|---|---|---|---|
|  |  |  |  |  |
|  |  |  |  |  |

FIG. 3C

Computation of Global Tick 0, local tick 2

|  | c0 | c1 | c2 | c3 | c4 | c5 |
|---|---|---|---|---|---|---|
| r0 |  |  |  |  |  |  |
| r1 |  |  | A+ | B- | C- |  |
| r2 |  |  | D+ | E- | F- |  |
| r4 |  |  | G+ | H- | I- |  |

Delay Register Data *210* (columns c0–c2) | Activation Line Data *220* (columns c3–c5)

Tiles 3-5
Tiles 6-8
Tiles 0-2

$V12 = R1C2*A + R1C3*B + R1C4*C + R2C2*D + R2C3*E + R2C4*F + R3C2*G + R3C3*H + R3C4*I$

Output values produced:

| V10 | V11 | V12 |  |  |
|---|---|---|---|---|

FIG. 3D

ENHANCED INPUT OF MACHINE-LEARNING ACCELERATOR ACTIVATIONS

CROSS-REFERENCE TO RELATED APPLICATION

This application claims priority to U.S. Provisional Application No. 62/935,038, filed on Nov. 13, 2019. The disclosure of the prior application is considered part of and is incorporated by reference in the disclosure of this application.

BACKGROUND

This specification relates to machine-learning accelerators.

A machine-learning accelerator is an application-specific integrated circuit (ASIC) that is designed for performing highly parallel synchronous operations. The parallelism is achieved by integrating many different independent processing elements that can execute concurrently.

Such devices are well-suited for accelerating inference passes through neural networks. Neural networks are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Typically the computational operations required for each layer can be achieved by performing matrix multiplications. Often one of the matrices is a vector, e.g., a matrix-by-vector multiplication. Machine-learning accelerators thus allow the multiplies and adds of a matrix multiplication to be performed with high parallelism.

One of the limiting factors for machine-learning accelerators is data throughput. In particular, reading input values from memory is an operation having a relatively high latency relative to the latency of sending data through the accelerator and performing the required mathematical operations.

Another inefficiency with certain machine-learning algorithms is repeated reading of the same values from memory. For example, to perform a 3×3 convolution, each input value can be used up to 9 times, possibly requiring 9 different reads from memory for the same value.

SUMMARY

This specification describes the architecture of a machine-learning accelerator and a corresponding scheduling technique that improves data throughput and reduces redundant reads from memory. In particular, the accelerator can use delay registers and scheduling logic so that each input value is read only once per row or once overall.

Particular embodiments of the subject matter described in this specification can be implemented so as to realize one or more of the following advantages. A machine-learning accelerator can enhance the input bandwidth of reading from memory by using scheduling logic that chooses between activation lines and delay registers. Thus, the overall hardware utilization is improved, resulting in more efficient computation. Overall input latency is also reduced by reading each input value only once per row or once overall.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a visualization of a convolution operation.

FIG. 3B illustrates computing a convolution using only delay registers.

FIG. 3C illustrates computing a convolution using one activation line and two delay registers.

FIG. 3D illustrates computing a convolution using two activation lines and one delay register.

Like reference numbers and designations in the various drawings indicate like elements.

DETAILED DESCRIPTION

This specification describes the architecture of a machine-learning accelerator that can be used to improve input data bandwidth. In particular, the techniques described below reduce the number of redundant values that need to be read from a memory device.

Figure 1:
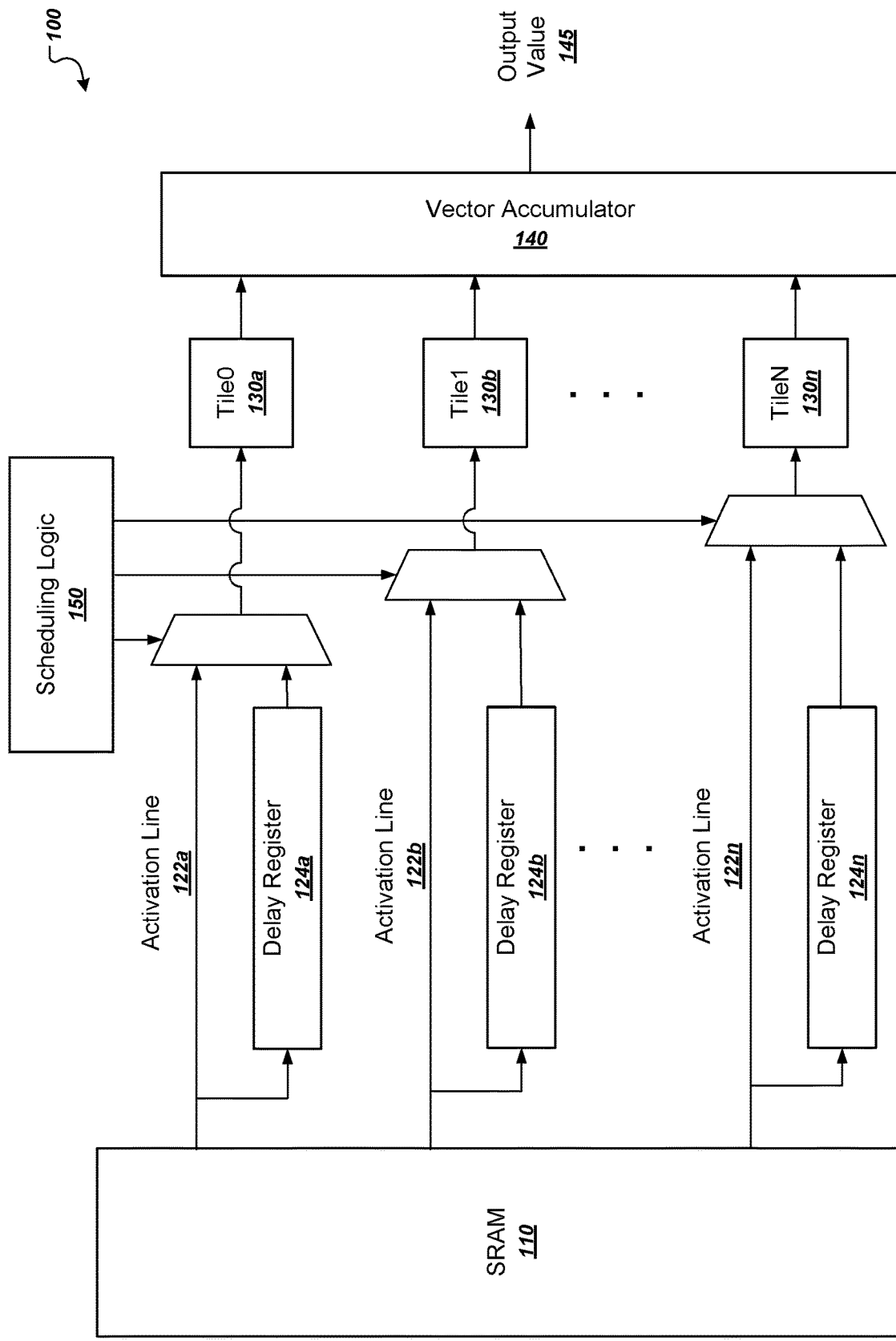
FIG. 1 is a diagram of an example subsystem of a machine-learning accelerator.

FIG. 1 is a diagram of an example subsystem 100 of a machine-learning accelerator. A machine-learning accelerator will typically have many instances of the components illustrated in FIG. 1. A more detailed example of how these components can be integrated into a larger system is described in more detail below with reference to FIGS. 5-6.

The general arrangement of the subsystem 100 includes a static random-access memory (SRAM) 110 that stores activations to be acted upon by multiple tiles 130a-n. In this specification, the term "activation" is used for inputs to the machine-learning accelerator because in real-world systems, the tiles 130a-n may operate on matrixes or tensors rather than individual values. For that reason, in this specification, a tile refers to a device having a computational array of cells that can perform computations on a portion of a matrix or tensor. Each cell thus includes circuitry that allows the cell to perform mathematical or other computations. In a typical scenario, a tile receives an input tensor, uses the computational array to multiply the input tensor by a weight tensor, and generates an output tensor. In the examples below, single variables will often be used for simplicity and clarity, but in real applications, each single variable can represent a higher-dimensional tensor and not just a singular numerical value.

The tiles 130a-n can each be fed an activation line 122a-n or a corresponding delay register 124a-n. Scheduling logic 150 can determine which inputs the tiles 130a-n will receive. Generally, the scheduling logic 150 determines when the tiles should receive activation line data versus delay register data. At predictable and periodic times, the values in the delay registers 124a-n are replaced by respective values on the corresponding activation lines 122a-n.

Generally, the activations on the activation lines are continuously available for any tiles that desire to read their values. Thus, although not in shown in FIG. 1, the system can actually include circuitry resources that maintain or refresh the activations on the activation lines without having to perform another read from the SRAM 110.

Each tile 130a-n can perform a matrix or tensor operation on the input activations received either from an activation line or a delay register. Each tile 130a-n can then forward the result to a vector accumulator 140, which computes an output value 145 from each of the results generated by the tiles.

The system illustrated in FIG. 1 can improve input data efficiency by using the delay registers to reduce redundant reads from the SRAM 110. The delay registers in effect give the system access to potentially 2N swaths of data, where N is the size of one dimension of the convolution kernel.

Thus, on each global tick, each row group reads N new values in respective rows from SRAM and places the previously read values in delay registers. This arrangement is illustrated in FIG. 2.

In this specification, a global tick is an operation of the system in which new values are read from SRAM.

In this specification, a local tick is an operation of the system in which a new output convolution value is computed. This occurs when a tile receives a new value from an activation line or from a delay register. Each global tick thus typically spans multiple local ticks.

FIG. 2 is a visualization of a convolution operation. FIG. 2 illustrates the data stored in the delay registers and the activation registers at a particular moment in time, which in this case is global tick 1, local tick 1.

On global tick 0, the row groups read values from the first three columns of the input data, e.g., columns 0-2.

On global tick 1, the row groups populate the delay registers with the previously read values and read new values from the next three columns of the input data, e.g., columns 3-5. Thus, the delay register data 210 holds input values R0C0, R0C1, R0C2, R1C0, R1C1, R1C2, R2C0, R2C1, and R2C2. Meanwhile, the activation line data 220 holds input values R0C3, R0C4, R0C5, R1C3, R1C4, R1C5, R2C3, R2C4, and R2C5.

However, the system does not need all of these values to compute the output convolution value at location R0C1. Rather, the scheduling logic determines which of the activation line data 220 and the delay register data 210 to feed to the tiles in order to compute the output convolution value.

FIG. 2 also illustrates the convolution kernel weights overlaid on the input data. In this specification, the "+" and "−" symbols are used as a shorthand annotation on convolution kernel weights to indicate whether the weight is to be multiplied by activation line data 220 or delay register data 210. Thus, in FIG. 2, the weights A, B, D, E, G, and H will be multiplied by delay register data because they have the "+" annotation, while the weights C, F, and I will be multiplied by activation line data because they have the "−" annotation.

As will be described in more detail below, the system can read new values from SRAM on each global tick, and then compute multiple convolution values from the values read from SRAM.

Figure 3A:
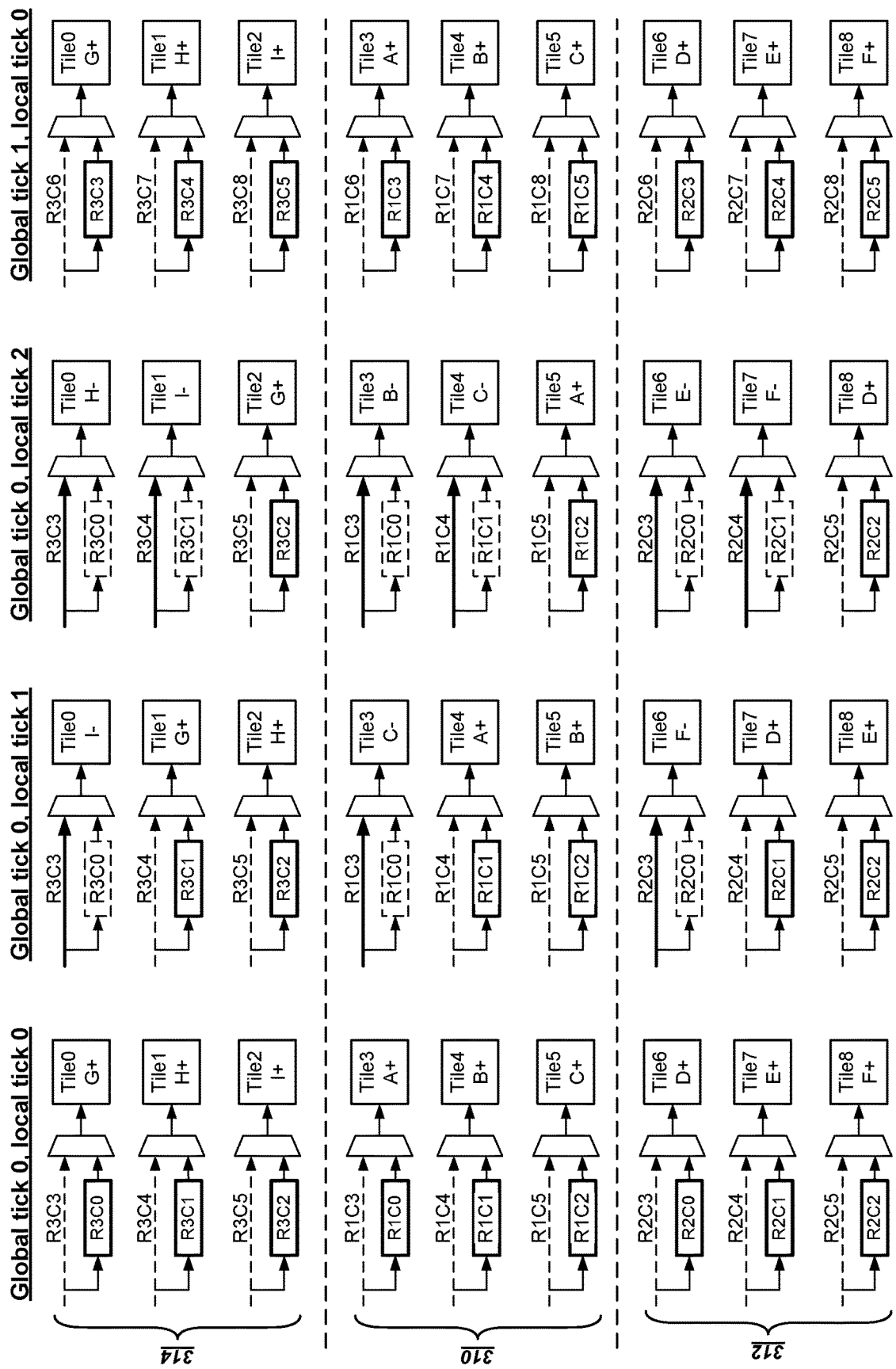
FIG. 3A illustrates a detailed example of how the scheduling logic chooses between activation line data and delay register data on each local tick.

FIG. 3A illustrates a detailed example of how the scheduling logic chooses between activation line data and delay register data on each local tick.

This example assumes a 3×3 convolution having weights A through I. And there are thus 3 row groups 310, 312, and 314 each having 3 tiles each. The row groups include a first row group 310, a second row group 312, and a third row group 314.

This example starts at row 1, column 0, meaning that convolution values for row 0 have already been computed. In other words, the example in FIG. 3 starts at the second pass over rows of the input image data.

Notably, this means that tiles 0-2 in the first row group are not assigned to the first row of input data. This is because the second row group was already assigned to row 1 and the third row group was already assigned to row 2. Thus, when starting the second pass over rows of the input image, the system can assign the first row group to column 3.

On each global tick, the system reads three values from SRAM for each row group and computes a new output convolution value on each local tick. FIG. 3A illustrates several data feeding patterns that help to optimize the input data bandwidth. The first pattern is the basic pattern of data selection that includes reading from: three delay registers on local tick 0, two delay registers and one activation line on local tick 1, and one delay register and two activation lines on local tick 2.

FIG. 3A also illustrates the basic pattern of striding by row group. In general, the system advances the stride of each tile by the convolution kernel size on each global tick. Thus, on global tick 0, tile 3 is reading from column 3. On global tick 1, tile 3 is reading from column 6.

FIG. 3A also illustrates the pattern that each tile cycles through weights along one row of the convolution kernel. Thus, tile 3 uses weight A on local tick 0, then weight C on local tick 1, then weight B on local tick 2. Other tiles have similar weight cycling patterns. The scheduling logic of the chip can thus optimize the input bandwidth for the tile by implementing these data reading patterns through the activation lines and delay registers.

In FIG. 3A, selected data sources are bolded, while unselected data sources are illustrated with dashed lines. Thus, on global tick 0, local tick 0, all tiles receive data from delay registers instead of activation lines. After each local tick, the tiles perform a multiplication of a weight by the selected data source, and the result is summed by a vector accumulator and written at the specified location in the output data.

At local tick 0, using all the delay registers results in the computation V10=R1C0*A+R1C1*B+R1C2*C+R2C0*D+R2C1*E+R2C2*F+R3C0*G+R3C1*H+R3C2*I.

This computation is visualized in FIG. 3B. FIG. 3B illustrates that in this operation, no activation line data 220 is used at all.

As shown in FIG. 3A, on global tick 0, local tick 1, the tiles use a mix of activation line data and delay register data. In particular, as illustrated in FIG. 3C, each row group uses two delay registers and one activation line. This results in the system performing the computation V11=R1C1*A+R1C2*B+R1C3*C+R2C1*D+R2C2*E+R2C3*F+R3C1*G+R3C2*H+R3C3*I.

As shown in FIG. 3A, on global tick 0, local tick 2, the tiles use additional data from the activation lines. As illustrated in FIG. 3D, each row group uses one delay register and two activation lines. This results in the system performing the computation V12=R1C2*A+R1C3*B+R1C4*C+R2C2*D+R2C3*E+R2C4*F+R3C2*G+R3C3*H+R3C4*I.

As shown in FIG. 3A, after the last local tick of a global tick, the system can populate the delay register with data from the activation line. Thus, for example, as illustrated in FIG. 3A, at global tick 1, local tick 0, the delay registers have been overwritten with data from the previous activation lines.

Figure 4:
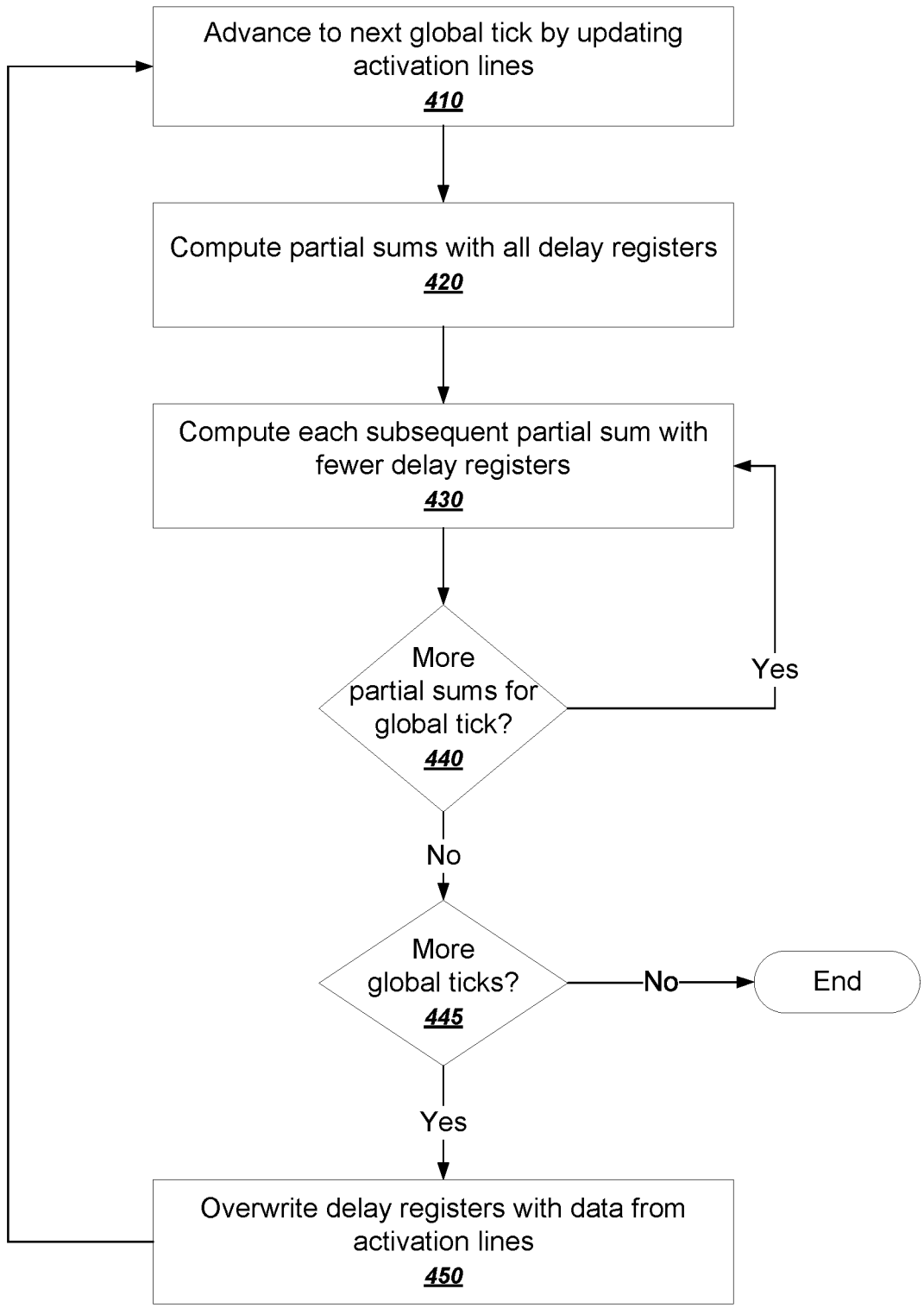
FIG. 4 is a flowchart of an example process for performing a convolution using a repeating pattern of data from activation lines and delay registers.

FIG. 4 is a flowchart of an example process for performing a convolution using a repeating pattern of data from activation lines and delay registers. The example process in FIG. 4 is an example of how scheduling logic for a machine-learning accelerator having multiple tiles can control the inputs that are fed into the tiles. The process will be described as being performed by a processor, e.g., a machine-learning accelerator.

The processor advances to a next global tick by updating activation lines and delay registers (410). As described above, at each global tick, the processor can read new values from memory and make them available on the activation lines. Typically the new values read from memory are determined by a stride length, which can be based on the size of the convolution kernel. For example, for a 3×3 convolution, if a tile reads from column 1 on global tick 1, the tile can read from column 4 on global tick 2.

The first iteration in a row can present a special case in which the data from the activation line should be available in both the delay register and the activation line. In those situations, the processor can make the newly read data available in both places.

The processor computes convolution partial sums with all delay registers (420). At the start of a global tick, when the delay registers have all been updated, the values for the next convolution reside completely in the delay registers. Thus, the processor computes a partial convolution sum by multiplying each weight of the kernel by an activation in a delay register.

The processor computes each subsequent partial sum in the global tick with fewer delay registers (430). In doing so, the system determines whether there are more partial sums for the global tick (440) and whether there are more global ticks (445). In other words, on each local tick, the number of delay registers used decreases while the number of activation lines increases. For example, as illustrated in FIG. 3A, on global tick 0, local tick 0, the processor used 9 delay registers. On local tick 1, the processor used 6 delay registers, and on local tick 2, the processor used only 3 delay registers.

The processor overwrites delay registers with data from the activation lines (450). In other words, the processor can replaces the data in the delay registers with previous data on the activation lines. The processor can do this before reading new activation line data in order to avoid losing data due to overwrites.

Figure 5:
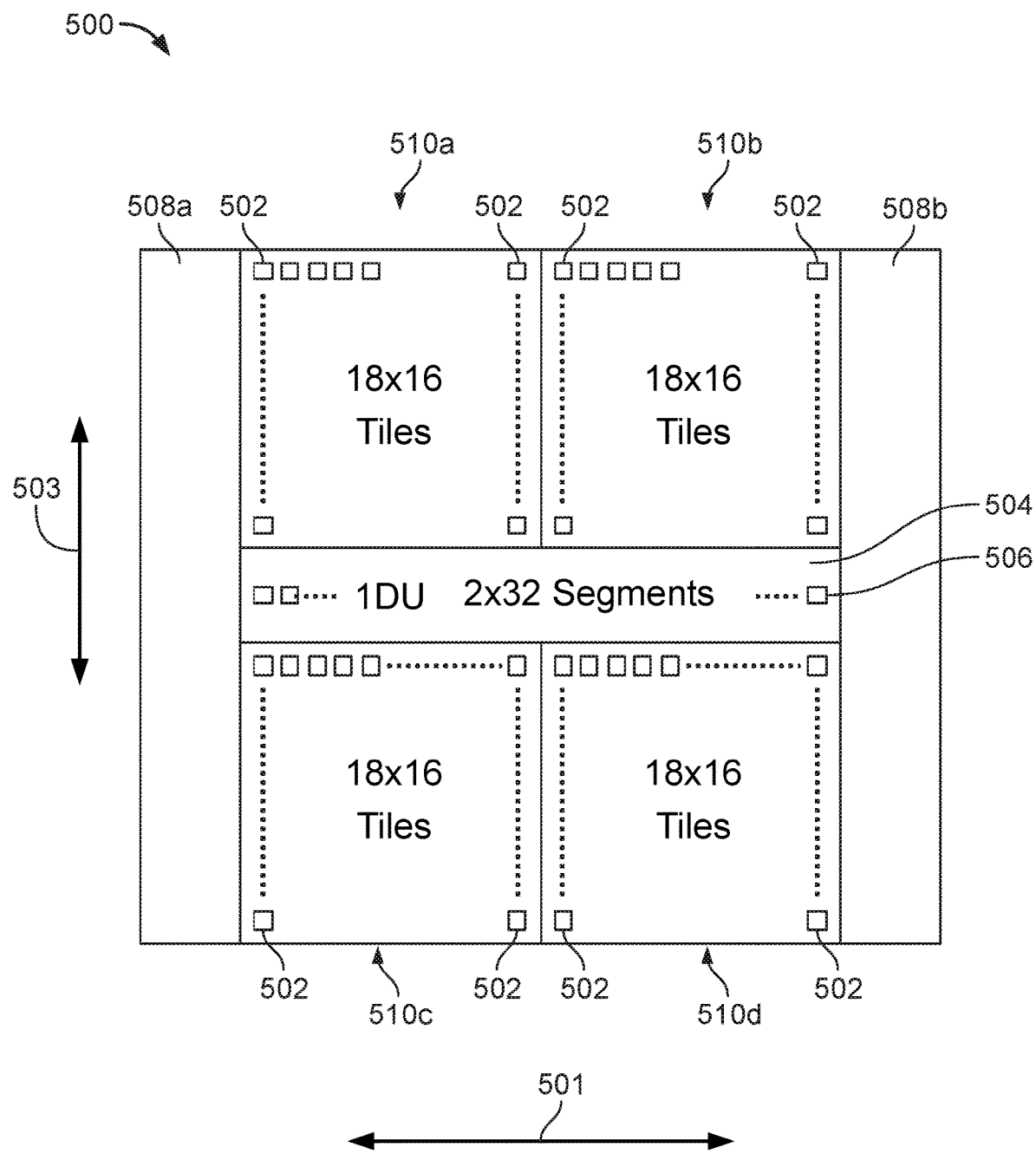
FIG. 5 is a schematic that illustrates an example of special purpose logic circuitry.

FIG. 5 is a schematic that illustrates an example of special purpose logic circuitry, in particular, an ASIC 500. The ASIC 500 includes multiple synchronous processors that for brevity will be referred to as tiles. For example, the ASIC 500 includes tiles 502, in which one or more of the tiles 502 includes special purpose circuitry configured to perform synchronous computations, such as e.g., multiplication and addition operations. In particular, each tile 502 can include a computational array of cells, in which each cell is configured to perform mathematical operations (see, e.g., the exemplary tile 200 shown in FIG. 6, and described herein). In some implementations, the tiles 502 are arranged in a grid pattern, with tiles 502 arranged along a first dimension 501 (e.g., rows) and along a second dimension 503 (e.g., columns). For instance, in the example shown in FIG. 5, the tiles 502 are divided into four different sections (510a, 510b, 510c, 510d), each section containing 288 tiles arranged in a grid of 18 tiles down by 16 tiles across. In some implementations, the ASIC 500 shown in FIG. 5 may be understood as including a single systolic array of cells subdivided/arranged into separate tiles, in which each tile includes a subset/sub-array of cells, local memory and bus lines (see, e.g., FIG. 6).

The ASIC 500 also includes a vector processing unit 504. The vector processing unit 504 includes circuitry configured to receive outputs from the tiles 502 and compute vector computation output values based on the outputs received from the tiles 502. For example, in some implementations, the vector processing unit 504 includes circuitry (e.g., multiply circuitry, adder circuitry, shifters, and/or memory) configured to perform accumulation operations on the outputs received from the tiles 502. Alternatively, or in addition, the vector processing unit 504 includes circuitry configured to apply a non-linear function to the outputs of the tiles 502. Alternatively, or in addition, the vector processing unit 504 generates normalized values, pooled values, or both. The vector computation outputs of the vector processing units can be stored in one or more tiles. For example, the vector computation outputs can be stored in memory uniquely associated with a tile 502. Alternatively, or in addition, the vector computation outputs of the vector processing unit 504 can be transferred to a circuit external to the ASIC 500, e.g., as an output of a computation. In some implementations, the vector processing unit 504 is segmented, such that each segment includes circuitry configured to receive outputs from a corresponding collection of tiles 502 and computes vector computation outputs based on the received outputs. For instance, in the example shown in FIG. 5, the vector processing unit 504 includes two rows spanning along the first dimension 501, each of the rows including 32 segments 506 arranged in 32 columns. Each segment 506 includes circuitry (e.g., multiply circuitry, adder circuitry, shifters, and/or memory) configured to perform a vector computation, as explained herein, based on outputs (e.g., an accumulated sum) from a corresponding column of tiles 502. The vector processing unit 504 can be positioned in the middle of the grid of tiles 502 as shown in FIG. 5. Other positional arrangements of the vector processing unit 504 are also possible.

The ASIC 500 also includes a communication interface 508 (e.g., interfaces 508a, 508b). The communication interface 508 includes one or more sets of serializer/deserializer (SerDes) interfaces and a general purpose input/output (GPIO) interface. The SerDes interface is configured to receive instructions (e.g., instructions for operating controllable bus lines described below) and/or input data for the ASIC 500 and to output data from the ASIC 500 to an external circuit. For example, the SerDes interface can be configured to transmit instructions and/or input data at a rate of 32 Gbps, 56 Gbps, or any suitable data rate over the set of SerDes interfaces included within the communications interface 508. The GPIO interface is configured to provide an interface for debugging and/or bootstrapping. For example, the ASIC 500 may run a boot program when it is turned on. If the program fails, an administrator may use the GPIO interface to debug the source of the failure.

The ASIC 500 further includes multiple controllable bus lines (see, e.g., FIG. 6) configured to convey data among the communications interface 508, the vector processing unit 504, and the multiple tiles 502. Controllable bus lines include, e.g., wires that extend along both the first dimension 501 (e.g., rows) of the grid and the second dimension 503 (e.g., columns) of the grid. A first subset of the controllable bus lines extending along the first dimension 501 can be configured to transfer data in a first direction (e.g., to the right of FIG. 5). A second subset of the controllable bus lines extending along the first dimension 501 can be configured to transfer data in a second direction (e.g., to the left of FIG. 5). A first subset of the controllable bus lines extending along the second dimension 503 can be configured to transfer data in a third direction (e.g., to the top of FIG. 5). A second subset of the controllable bus lines extending along the second dimension 503 can be configured to transfer data in a fourth direction (e.g., to the bottom of FIG. 5).

Each controllable bus line includes multiple conveyer elements, such as flip-flops, that are used to convey data along the lines in accordance with a clock signal. Transferring data over a controllable bus line can include shifting, at each clock cycle, data from a first conveyer element of the controllable bus line to a second adjacent conveyer element of the controllable bus line. In some implementations, data is conveyed over the controllable bus lines upon the rising or falling edge of a clock cycle. For example, data present, at a first clock cycle, on a first conveyer element (e.g., a flip-flop) of a controllable bus line can be transferred to a second conveyer element (e.g., a flip-flop) of the controllable bus line at a second clock cycle. In some implementations, the conveyer elements can be periodically spaced apart at a fixed distance from one another. For example, in some cases, each controllable bus line includes multiple conveyer elements, with each conveyer element positioned within or proximate to a corresponding tile 502.

Each controllable bus line also includes multiple multiplexers and/or demultiplexers. A multiplexer/demultiplexer of a controllable bus line is configured to transfer data between the bus line and a component of the ASIC chip 500. For example, a multiplexer/demultiplexer of a controllable bus line can be configured to transfer data to and/or from a tile 502, to and/or from the vector processing unit 504, or to and/or from the communication interface 508. Transferring data among tiles 502, the vector processing unit 504, and the communication interface 508 can include sending control signals to the multiplexers based on the desired data transfer to take place. The control signals can be stored in registers coupled directly to the multiplexer and/or demultiplexers. The value of the control signal then may determine, e.g., what data is transferred from a source (e.g., memory within a tile 502 or a vector processing unit 504) to a controllable bus line or, alternatively, what data is transferred from the controllable bus line to a sink (e.g., memory within a tile 502 or a vector processing unit 504).

The controllable bus lines are configured to be controlled on a local level, such that each tile, vector processing unit, and/or communication interface includes its own set of control elements for manipulating the controllable bus lines passing through that tile, vector processing unit, and/or communication interface. For example, each tile, one-dimensional (1D) vector processing unit, and communication interface may include a corresponding set of conveyer elements, multiplexers and/or demultiplexers for controlling data transfer to and from that tile, 1D vector processing unit, and communication interface.

To minimize latency associated with operations of the ASIC chip 500, the tiles 502 and vector processing unit 504 can be positioned to reduce the distance data travels among the various components. In a particular implementation, both the tiles 502 and communication interface 508 can be segregated into multiple sections, with both the tile sections and the communication interface sections being arranged such that the maximum distance data travels between a tile and a communication interface is reduced. For instance, in some implementations, a first group of tiles 502 can be arranged in a first section on a first side of the communications interface 508, and a second group of tiles 502 can be arranged in a second section on a second side of the communication interface. As a result, the distance from a communication interface to the furthest tile may be cut in half compared to a configuration in which all of the tiles 502 are arranged in a single section on one side of the communication interface. Alternatively, the tiles may be arranged in a different number of sections, such as four sections. For instance, in the example shown in FIG. 5, the multiple tiles 502 of ASIC 500 are arranged in multiple sections 510 (510a, 510b, 510c, 510d). Each section 510 includes a similar number of tiles 502 arranged in a grid pattern (e.g., each section 510 can include 256 tiles arranged in 16 rows and 16 columns). The communication interface 508 also is divided into multiple sections: a first communication interface 508a and a second communication interface 508b arranged on either side of the sections 510 of tiles 502. The first communication interface 508a can be coupled, through controllable bus lines, to the two tile sections 510a, 510c on the left side of the ASIC chip 500. The second communication interface 508b can be coupled, through controllable bus lines, to the two tile sections 510b, 510d on the right side of the ASIC chip 500. As a result, the maximum distance data travels (and thus the latency associated with the data propagation) to and/or from a communication interface 508 can be halved compared to an arrangement in which only a single communication interface is available. Other coupling arrangements of the tiles 502 and communication interfaces 508 are also possible to reduce data latency. The coupling arrangement of the tiles 502 and communication interface 508 can be programmed by providing control signals to the conveyer elements and multiplexers of the controllable bus lines.

In some implementations, one or more tiles 502 are configured to initiate reading and writing operations with respect to controllable bus lines and/or other tiles within the ASIC 500 (referred to herein as "control tiles"). The remaining tiles within the ASIC 500 can be configured to perform computations based on the input data (e.g., to compute layer inferences). In some implementations, the control tiles include the same components and configuration as the other tiles within the ASIC 500. The control tiles can be added as an extra tile or tiles, an extra row or rows, or an extra column or columns of the ASIC 500. For example, for a symmetric grid of tiles 502, in which each tile 502 is configured to perform a computation on input data, one or more additional rows of control tiles can be included to handle reading and writing operations for the tiles 502 performing computations on the input data. For instance, each section 510 includes 18 rows of tiles, where the last two rows of tiles may include control tiles. Providing separate control tiles increases, in some implementations, the amount of memory available in the other tiles used to perform the computations. Separate tiles dedicated to providing control as described herein are not necessary, however, and in some cases, no separate control tiles are provided. Rather, each tile may store in its local memory instructions for initiating reading and writing operations for that tile. Furthermore, while each section 510 shown in FIG. 5 includes tiles arranged in 18 rows by 16 columns, the number of tiles 502 and their arrangement in a section can be different. For example, in some cases, the sections 510 may include an equal number of rows and columns.

Furthermore, although shown in FIG. 5 as divided into four sections, the tiles 502 can be divided into other different groupings. For example, in some implementations, the tiles 502 are grouped into two different sections, such as a first section above the vector processing unit 504 (e.g., nearer the top of the page shown in FIG. 5) and a second section below the vector processing unit 504 (e.g., nearer to the bottom of the page shown in FIG. 5). In such an arrangement, each section may contain, e.g., 576 tiles arranged in a grid of 18 tiles down (along direction 503) by 32 tiles across (along direction 501). Sections may contain other total numbers of tiles and may be arranged in different sized arrays. In some cases, the divisions between sections are delineated by hardware features of the ASIC 500. For example, as shown in FIG. 5, sections 510a, 510b may be separated from sections 510c, 510d by the vector processing unit 504.

Latency also may be reduced by centrally locating the vector processing unit 504 relative to the tile sections 510. In some implementations, a first half of the tiles 502 are arranged on a first side of the vector processing unit 504, and a second half of the tiles 502 are arranged on a second side of the vector processing unit 504.

For example, in the ASIC chip 500 shown in FIG. 5, the vector processing unit 504 includes two sections (e.g., two rows), each of which includes a number of segments 506 that matches the number of columns of tiles 502. Each segment 506 can be positioned and configured to receive an output, such as an accumulated sum, from a corresponding column of tiles 502 within a section 510 of tiles. In the example shown in FIG. 5, the tile sections 510a, 510b positioned on a first side of the vector processing unit 504 (e.g., above the vector processing unit 504) can be coupled, through controllable bus lines, to the top row of segments 506. The tile sections 510c, 510d positioned on a second side of the vector processing unit 504 (e.g., below the vector processing unit 504) can be coupled, through controllable bus lines, to the bottom row of segments 506. Furthermore, each tile 502 within the first half above the vector processing unit 504 can be positioned at a same distance from the vector processing unit 504 as a respective tile 502 within the second half below the vector processing unit 504, such that there is no difference in overall latency between the two halves. For instance, the tiles 502 in row i in the first section 510a (where the variable i corresponds to the row position) can be positioned at the same distance away from vector processing unit 504 as the tiles 502 in row m-1-i in a second section of tiles (e.g., the section 510c) (where m represents the total number of rows in each section, and assuming rows are incremented along the same direction in both sections).

Configuring the tile sections 510 in this manner can halve the distance data travels (and thus the latency associated with the data propagation) to and/or from the vector processing unit 504 compared to an arrangement in which the vector processing unit 504 is positioned at a far end (e.g., the bottom) of all the tiles 502. For instance, the latency associated with receiving an accumulated sum through a column of tiles 502 from section 510a can be half the latency associated with receiving an accumulated sum through a column of tiles 502 from sections 510a and 510c. The coupling arrangements of the tiles 502 and the vector processing unit 504 can be programmed by providing control signals to the conveyer elements and multiplexers of the controllable bus lines.

During operation of the ASIC chip 500, activation inputs may be shifted between tiles. For example, activation inputs can be shifted along the first dimension 501. In addition, outputs from computations performed by the tiles 502 (e.g., outputs of computations performed by computational array within the tile 502) can be shifted along the second dimension 503 between tiles.

In some implementations, the controllable bus lines can be physically hardwired to cause data to skip tiles 502 to reduce latency associated with the operations of the ASIC chip 500. For example, an output of a computation performed by a first tile 502 can be shifted along the second dimension 503 of the grid to a second tile 502 positioned at least one tile away from the first tile 502, thus skipping the tile in between. In another example, an activation input from a first tile 502 can be shifted along the first dimension 501 of the grid to a second tile 502 positioned at least one tile away from the first tile 502, thus skipping the tile in between. By skipping at least one tile when shifting the activation input or the output data, the overall data path length can be reduced, such that the data is transferred faster (e.g., there is no need to utilize a clock cycle to store data at the skipped tile), and latency is reduced.

In an example implementation, each tile 502 within each column of section 510a can be configured, through the controllable bus lines, to pass output data along the second dimension 503 toward the vector processing unit 504. The tiles 502 within each column can be further configured to pass the data toward the vector processing unit 504 by skipping the next adjacent tile (e.g., through physical hardwiring of the controllable bus lines between tiles). That is, a tile 502 at a position (i, j)=(0, 0) in the first section 510a (where the variable i corresponds to the row position and the variable j corresponds to the column position) can be hardwired to pass output data to a tile 502 at a position (i, j)=(2, 0); similarly, the tile 502 at a position (i, j)=(2, 0) in the first section 510a can be hardwired to pass output data to a tile 502 at a position (i, j)=(4, 0), and so forth. The last tile that is not skipped (e.g., the tile 502 located at position (i, j)=(16, 0)) passes output data to the vector processing unit 504. For a section 510 having 18 rows of tiles, such as the example shown in FIG. 5, the tile skipping ensure that all tiles within a section 510 are at most 9 "tile hops" away from the vector processing unit 504, thus improving the ASIC chip 500 performance by reducing the data path length and resulting data latency by half.

In another example implementation, each tile 502 within each row of sections 510a, 510c and within each row of sections 510b, 510d can be configured, through the controllable bus lines, to pass activation inputs along the first dimension 501. For example, some tiles within the sections 510a, 510b, 510c, 510d can be configured to pass activation inputs toward a center of the grid of tiles 502 or toward the communication interfaces 508. The tiles 502 within each row can be further configured skip adjacent tiles, e.g., by hardwiring the controllable bus lines between tiles. For example, a tile 502 at a position (i, j)=(0, 0) in the first section 510a (where the variable i corresponds to the row position and the variable j corresponds to the column position) can be configured to pass activation inputs to a tile 502 at a position (i, j)=(0, 2); similarly, a tile 502 at a position (i, j)=(0, 2) in the first section 510a can be configured to pass activation inputs to a tile 502 at a position (i, j)=(0, 4), and so forth. In some cases, the last tile that is not skipped (e.g., the tile 502 located at position (i, j)=(0, 14)) does not pass the activation input on to another tile.

Similarly, tiles that are skipped may pass activation inputs in the opposite direction. For example, a tile 502 at a position (i, j)=(0, 15) in the first section 510a (where the variable i corresponds to the row position and the variable j corresponds to the column position) can be configured to pass activation inputs to a tile 502 at a position (i, j)=(0, 13); similarly, a tile 502 at a position (i, j)=(0, 13) in the first section 510a can be configured to pass activation inputs to a tile 502 at a position (i, j)=(0, 11), and so forth. In some cases, the last tile that is not skipped (e.g., the tile 502 located at position (i, j)=(0, 1)) does not pass the activation input on to another tile. By skipping tiles, it is possible, in some implementations, to improve the ASIC chip 500 performance by reducing the data path length and resulting data latency by half.

As explained herein, in some implementations, one or more of the tiles 502 are dedicated to storing control information. That is, the tiles 502 dedicated to storing control information do not take part in performing calculations on input data such as weight inputs and activation inputs. Control information can include, e.g., control data for configuring the controllable bus lines during operation of the ASIC chip 500 so that data can be moved around the ASIC chip 500. The control data can be provided to the controllable bus lines in the form of control signals for controlling the conveyer elements and multiplexers of the controllable bus lines. The control data specifies whether particular conveyer elements of the controllable bus lines pass data to a next conveyer element of the controllable bus line so that data is transferred among the tiles according to a predetermined schedule. The control data additionally specifies whether data is transferred from or to a bus line. For example, the control data can include control signals that direct a multiplexer to transfer data from a bus line to memory and/or other circuitry within a tile. In another example, the control data can include control signals that direct a multiplexer to transfer data from the memory and/or circuitry within the tile to the bus line. In another example, the control data can include control signals that direct a multiplexer to transfer data between a bus line and the communications interface 508 and/or between the bus line and the vector processing unit 504. Alternatively, as disclosed herein, dedicated control tiles are not used. Rather, in such cases, the local memory of each tile stores the control information for that particular tile.

Figure 6:
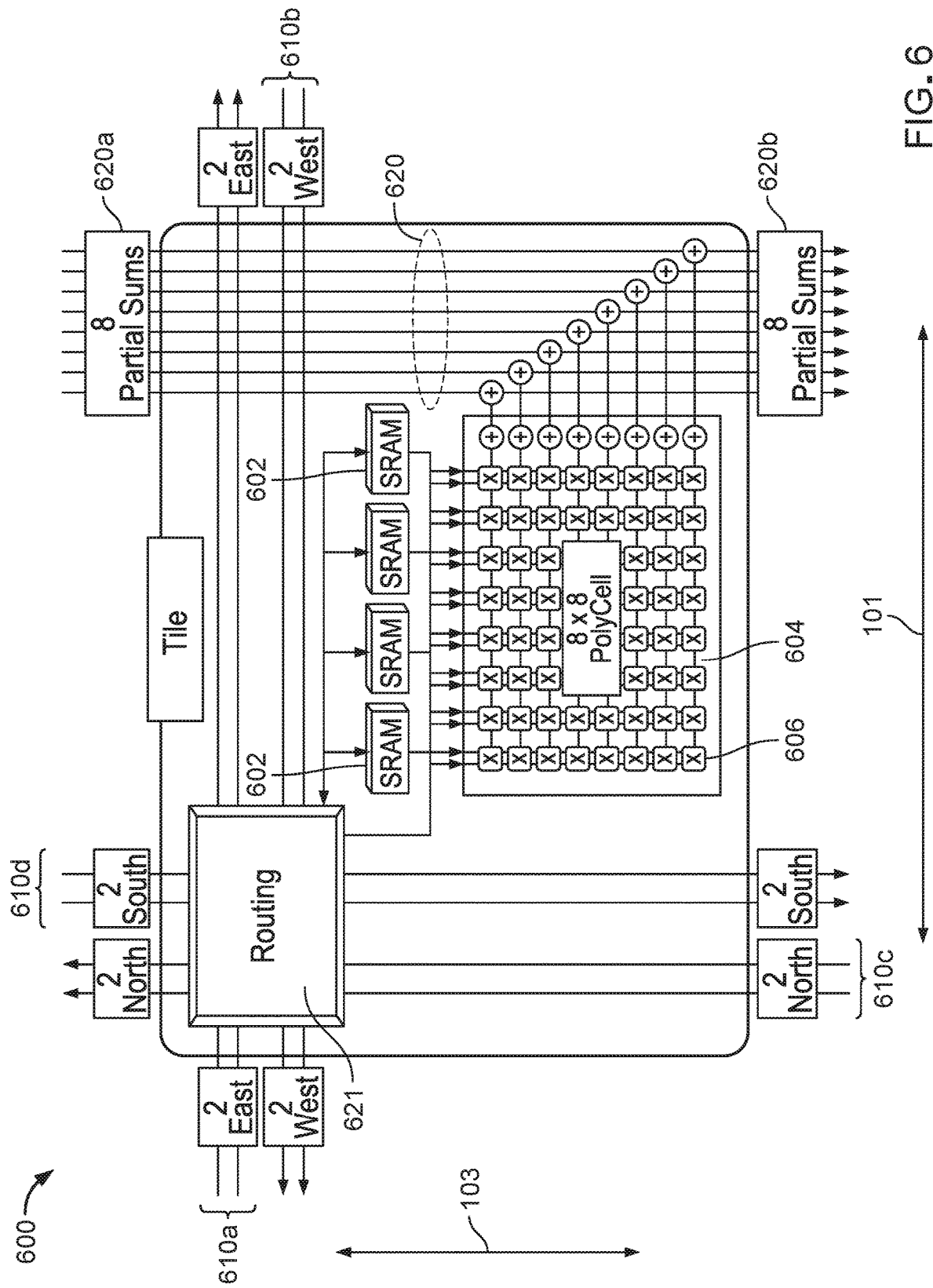
FIG. 6 illustrates example of a tile.

FIG. 6 illustrates example of a tile 600 for use in the ASIC chip 500. Each tile 600 includes local memory 602 and a computational array 604 coupled to the memory 602. The local memory 602 includes physical memory positioned proximate to the computational array 604. The computational array 604 includes multiple cells 606. Each cell 606 of the computational array 604 includes circuitry configured to perform a computation (e.g., a multiply and accumulate operation) based on data inputs, such as activation inputs and weight inputs, to the cell 606. Each cell can perform the computation (e.g., the multiply and accumulation operation) on a cycle of the clock signal. The computational array 604 can have more rows than columns, more columns than rows, or an equal number of columns and rows. For instance, in the example shown in FIG. 6, the computational array 604 includes 64 cells arranged in 8 rows and 8 columns. Other computational array sizes are also possible, such as computational arrays having 16 cells, 32 cells, 128 cells, or 256 cells, among others. Each tile can include the same number of cells and/or the same size computational array. The total number of operations that can be performed in parallel for the ASIC chip then depends on the total number of tiles having the same size computational array within the chip. For example, for the ASIC chip 500 shown in FIG. 5, which contains approximately 1150 tiles, this means that approximately 72,000 computations can be performed in parallel every cycle. Examples of clock speeds that may be used include, but are not limited to, 225 MHz, 500 MHz, 750 MHz, 1 GHz, 1.25 GHz, 1.5 GHz, 1.75 GHz, or 2 GHz. The computational arrays 604 of each individual tile is a subset of the larger systolic array of tiles, as illustrated in FIG. 1.

The memory 602 contained in the tile 600 can include, e.g., random-access memory (RAM), such as SRAM. Each memory 602 can be configured to store $(1/n)^{th}$ of the total memory associated with n tiles 502 of the ASIC chip illustrated in FIG. 5. The memory 602 can provided as a single chip or in multiple chips. For example, memory 602 shown in FIG. 6 is provided as four single-port SRAMs, each of which is coupled to the computational array 604. Alternatively, the memory 602 can be provided as two single-port SRAMs or eight single-port SRAMS, among other configurations. The joint capacity of the memory can be, but is not limited to, e.g., 16 kB, 32 kB, 64 kB, or 128 kB, after error correction coding. By providing the physical memory 602 locally to the computational arrays, the density of wiring for the ASIC 500 can be, in some implementations, vastly reduced. In an alternate configuration in which memory is centralized within the ASIC 500, as opposed to provided locally as described herein, may require a wire for each bit of memory bandwidth. The total number of wires needed to cover each tile of the ASIC 500 would far exceed the available space within the ASIC 100. In contrast, with dedicated memory provided for each tile, the total number of required to span the area of the ASIC 500 can be substantially reduced.

The tile 600 also includes controllable bus lines. The controllable bus lines may be categorized into multiple different groups. For example, the controllable bus lines can include a first group of general purpose controllable bus lines 610 configured to transfer data among tiles in each cardinal direction. That is, the first group of controllable bus lines 610 can include: bus lines 610a configured to transfer data toward a first direction along the first dimension 101 of the grid of tiles (referred to as "East" in FIG. 6); bus lines 610b configured to transfer data toward a second direction along the first dimension 101 of the grid of tiles (referred to as "West" in FIG. 6), in which the second direction is opposite to that of the first direction; bus lines 610c configured to transfer data toward a third direction along the second dimension 103 of the grid of tiles (referred to as "North" in FIG. 6); and bus lines 610d configured to transfer data toward a fourth direction along the second dimension 103 of the grid of tiles (referred to as "South" in FIG. 6), in which the fourth direction is opposite to the third direction. General purpose bus lines 610 can be configured to carry control data, activation input data, data from and/or to the communications interface, data from and/or to the vector processing unit, and data to be stored and/or used by the tile 600 (e.g., weight inputs). The tile 600 may include one or more control elements 621 (e.g., flip-flops and multiplexers) for controlling the controllable bus lines, and thus routing data to and/or from the tile 600 and/or from memory 602.

The controllable bus lines also can include a second group of controllable bus lines, referred to herein as computational array partial sum bus lines 620. The computational array partial sum bus lines 620 can be configured to carry data output from computations performed by the computational array 604. For example, the bus lines 620 can be configured to carry partial sum data obtained from the rows in the computational array 604, as shown in FIG. 6. In such case, the number of bus lines 620 would match the number of rows in the array 604. For instance, for a 8×8 computational array, there would be 8 partial sum bus lines 620, each of which is coupled to the output of a corresponding row in the computational array 604. The computational array output bus lines 620 can be further configured to couple to another tile within the ASIC chip, e.g., as inputs to a computational array of another tile within the ASIC chip. For example, the array partial sum bus lines 620 of tile 600 can be configured to receive inputs (e.g., partial sums 620a) of a computational array of a second tile that is located at least one tile away from the tile 600. The outputs of computational array 604 then are added to the partial sum lines 620 to produce new partial sums 620b, which may be output from the tile 600. The partial sums 620b then may be passed to another tile or, alternatively, to the vector processing unit. For example, each bus line 620 may be coupled to a corresponding segment (such as segments 506 in FIG. 5) of the vector processing unit.

As explained with respect to FIG. 5, the controllable bus lines can include circuitry such as conveyer elements (e.g., flip-flops) configured to allow data to be conveyed along the bus lines. In some implementations, each controllable bus line includes, for each tile, a corresponding conveyer element. As further explained with respect to FIG. 5, the controllable bus lines can include circuitry such as multiplexers configured to allow data to be transferred among the different tiles, the vector processing unit and the communications interface of the ASIC chip. The multiplexers can be located wherever there is a source or sink for data. For example, in some implementations, as shown in FIG. 6, control circuitry 621, such as multiplexers, can be located at crossings of controllable bus line (e.g., at the crossing of general purpose bus lines 610a and 610d, at the crossing of general purpose bus lines 610a and 610c, at the crossing of general purpose bus lines 610b and 610d, and/or at the crossing of general purpose bus lines 610b and 610c). The multiplexers at the bus line crossings can be configured to transfer data between the bus lines at the crossings. Accordingly, by proper operation of the multiplexers, it can be possible to change the direction in which data travels over the controllable bus lines. For example, data traveling along the first dimension 101 on general purpose bus lines 610a can be transferred to general purpose bus lines 610d, such that the data instead travels along the second dimension 103. In some implementations, multiplexers can be located adjacent to the memory 602 of the tile 600 so that data can be transferred to and/or from memory 602.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A processor comprising:
    a plurality of tiles;
    a plurality of activation lines that couple a memory device to a respective tile, wherein the memory device is configured to store an array of input data;
    a plurality of delay registers that are each paired with a respective activation line; and
    scheduling circuitry that is configured to select a respective input activation for each tile of the plurality of tiles from either an activation line for the tile or a delay register for the activation line, the delay register holding data previously carried by the activation line,
    wherein each tile, upon receiving an input activation from an activation line or a delay register, is configured to multiply the input activation by a respective weight of a plurality of weights of a kernel to generate a partial sum of a particular operation.

2. The processor of claim 1, wherein the processor is a machine-learning accelerator.

3. The processor of claim 1, wherein the particular operation is a convolution operation, and wherein the plurality of weights are a plurality of weights of a convolution kernel.

4. The processor of claim 1, further comprising a vector accumulator that is configured to compute an accumulated sum from partial sums computed by each of the plurality of tiles.

5. The processor of claim 1, wherein the processor is configured to read new values from the memory device on each of a plurality of global ticks.

6. The processor of claim 5, wherein the scheduling circuitry is configured to select input activations in a pattern in which a number of delay registers used decreases on each local tick of each global tick and a number of activation lines used increases on each local tick of each global tick.

7. The processor of claim 6, wherein the scheduling circuitry is configured to compute an output value using data from three delay registers and no activation lines for each row group of a plurality of row groups in the array of input data on a first local tick, compute an output value using data from two delay registers and one activation line for each row group on a second local tick, and compute an output value using data from one delay register and two activation lines for each row group on a third local tick.

8. The processor of claim 1, wherein each input activation is read from the memory device only once per row group.

9. The processor of claim 1, wherein the processor is configured to overwrite data in the delay registers with data from a paired activation line on each global tick.

10. A method performed by a processor comprising:
a plurality of tiles;
a plurality of activation lines that couple a memory device to a respective tile, wherein the memory device stores an array of input data;
a plurality of delay registers that are each paired with a respective activation line; and
scheduling circuitry,
the method comprising:
selecting, by the scheduling circuitry, a respective input activation for each tile of the plurality of tiles from either an activation line for the tile or a delay register for the activation line, the delay register holding data previously carried by the activation line, and
upon receiving, by each tile, an input activation from an activation line or a delay register, multiplying, by the tile, the input activation by a respective weight of a plurality of weights of a kernel to generate a partial sum of a particular operation.

11. The method of claim 10, wherein the processor is a machine-learning accelerator.

12. The method of claim 10, wherein the particular operation is a convolution operation, and wherein the plurality of weights are a plurality of weights of a convolution kernel.

13. The method of claim 10, further comprising computing, by a vector accumulator, an accumulated sum from partial sums computed by each of the plurality of tiles.

14. The method of claim 10, further comprising reading new values from the memory device on each of a plurality of global ticks.

15. The method of claim 14, further comprising selecting, by the scheduling logic, input activations in a pattern in which a number of delay registers used decreases on each local tick of each global tick and a number of activation lines used increases on each local tick of each global tick.

16. The method of claim 15, further comprising computing an output value using data from three delay registers and no activation lines for each row group of a plurality of row groups in the array of input data on a first local tick, compute an output value using data from two delay registers and one activation line for each row group on a second local tick, and compute an output value using data from one delay register and two activation lines for each row group on a third local tick.

17. The method of claim 10, wherein each input activation is read from the memory device only once per row group.

18. The method of claim 10, further comprising overwriting data in the delay registers with data from a paired activation line on each global tick.

* * * * *